United States Patent
Zhang et al.

(10) Patent No.: US 11,220,868 B2
(45) Date of Patent: Jan. 11, 2022

(54) SPLIT THREADS FOR FIXING ACCESSORIES TO A BODY

(71) Applicant: Smith International, Inc., Houston, TX (US)

(72) Inventors: Youhe Zhang, Spring, TX (US); Yuri Y. Burhan, Spring, TX (US); Huimin Song, Spring, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 286 days.

(21) Appl. No.: 16/439,779

(22) Filed: Jun. 13, 2019

(65) Prior Publication Data

US 2019/0383103 A1    Dec. 19, 2019

Related U.S. Application Data

(60) Provisional application No. 62/684,267, filed on Jun. 13, 2018.

(51) Int. Cl.
*E21B 10/43* (2006.01)
*F16L 15/00* (2006.01)

(52) U.S. Cl.
CPC ............ *E21B 10/43* (2013.01); *F16L 15/008* (2013.01)

(58) Field of Classification Search
CPC .......... E21B 10/43; E21B 10/62; E21B 12/00; E21B 2010/425; F16L 15/008
See application file for complete search history.

(56) References Cited

U.S. PATENT DOCUMENTS

| | | | | |
|---|---|---|---|---|
| 1,995,043 A | * | 3/1935 | Sanderson | E21B 17/04 175/413 |
| 3,271,080 A | * | 9/1966 | Gowanlock | E21C 35/183 299/103 |
| 3,749,190 A | * | 7/1973 | Shipman | E21B 10/56 175/426 |
| 4,199,035 A | * | 4/1980 | Thompson | E21B 10/56 175/413 |
| 4,466,498 A | * | 8/1984 | Bardwell | E21B 10/56 175/413 |
| 4,844,510 A | * | 7/1989 | Theiss | E21B 33/038 285/18 |
| 5,373,906 A | * | 12/1994 | Braddick | E21B 7/061 175/61 |
| 5,411,099 A | * | 5/1995 | Braddick | E21B 33/0422 166/387 |
| 5,678,645 A | | 10/1997 | Tibbitts et al. | |
| 5,906,245 A | | 5/1999 | Tibbitts et al. | |

(Continued)

FOREIGN PATENT DOCUMENTS

WO    WO-2016057076 A1 *    4/2016    ......... E21B 17/1057

*Primary Examiner* — Daniel P Stephenson

(57) ABSTRACT

An accessory is coupled to a body using a connection member inserted into a plurality of lateral recesses of a bore. The accessory includes a complementary connection mechanism to the connection member and is tightened in the bore with a torque. An example accessory is a nozzle for use with a drill bit. The nozzle includes threads and the drill bit includes a nozzle bore with lateral recesses. Partial thread segments are inserted into the lateral recesses, and the nozzle is threaded to the partial thread segments.

20 Claims, 10 Drawing Sheets

(56) References Cited

U.S. PATENT DOCUMENTS

| | | | | |
|---|---|---|---|---|
| 5,941,306 | A * | 8/1999 | Quinn | E21B 23/06 |
| | | | | 166/120 |
| 6,142,250 | A * | 11/2000 | Griffin | E21B 7/068 |
| | | | | 175/381 |
| 6,283,234 | B1 * | 9/2001 | Torbet | E21B 10/573 |
| | | | | 175/413 |
| 6,932,172 | B2 * | 8/2005 | Dvorachek | E21B 10/46 |
| | | | | 175/432 |
| 7,735,582 | B2 * | 6/2010 | Smith | E21B 10/62 |
| | | | | 175/340 |
| 8,011,456 | B2 * | 9/2011 | Sherwood, Jr. | E21B 10/633 |
| | | | | 175/368 |
| 8,201,892 | B2 * | 6/2012 | Hall | E21C 35/1933 |
| | | | | 299/102 |
| 8,479,845 | B1 * | 7/2013 | Qian | E21B 10/52 |
| | | | | 175/426 |
| 8,727,043 | B2 * | 5/2014 | Zhang | B23P 15/28 |
| | | | | 175/428 |
| 9,187,962 | B2 * | 11/2015 | Burhan | E21B 10/573 |
| 10,501,999 | B2 * | 12/2019 | Grosz | E21B 10/43 |
| 2001/0000591 | A1 * | 5/2001 | Tibbitts | E21B 17/04 |
| | | | | 175/57 |
| 2009/0020339 | A1 * | 1/2009 | Sherwood, Jr. | E21B 10/633 |
| | | | | 175/426 |
| 2010/0314176 | A1 * | 12/2010 | Zhang | E21B 10/567 |
| | | | | 175/383 |
| 2016/0273273 | A1 * | 9/2016 | Hinz | E21B 10/43 |
| 2018/0044994 | A1 * | 2/2018 | Matthews | E21B 10/60 |
| 2019/0145182 | A1 * | 5/2019 | Bomidi | E21B 7/046 |
| | | | | 175/432 |
| 2019/0383103 | A1 * | 12/2019 | Zhang | E21B 10/43 |
| 2020/0040668 | A1 * | 2/2020 | Slaughter, Jr. | E21B 17/046 |

\* cited by examiner

SPLIT THREADS FOR FIXING ACCESSORIES TO A BODY

CROSS-REFERENCE TO RELATED APPLICATIONS

This application claims the benefit of, and priority to, U.S. Patent Application No. 62/684,267 filed on Jun. 13, 2018, which is incorporated herein by this reference in its entirety.

BACKGROUND

Wellbores may be drilled into a surface location or seabed for a variety of exploratory or extraction purposes. For example, a wellbore may be drilled to access fluids, such as liquid and gaseous hydrocarbons, stored in subterranean formations and to extract the fluids from the formations. Wellbores used to produce or extract fluids may be lined with casing around the walls of the wellbore. A variety of drilling methods and tools may be utilized depending partly on the characteristics of the formation through which the wellbore is drilled. These tools may be attached to the drill string, the BHA, and other downhole systems.

A drilling system may use a variety of bits in the creation, maintenance, extension, and abandonment of a wellbore. Bits include drilling bits, mills, reamers, hole openers, and other cutting tools. Some drilling systems rotate a bit relative to the wellbore to remove material from the sides and/or bottom of the wellbore. Some bits are used to remove natural material from the surrounding geologic formation to extend or expand the wellbore. Some bits are used to remove material positioned in the wellbore during construction or maintenance of the wellbore. For example, bits are used to remove concrete and/or metal casing from a wellbore during maintenance, creation of a window for lateral drilling in an existing wellbore, or during remediation.

Some of these tools may have smaller accessories attached to them, such as cutting elements, valves, and nozzles. Hydraulic nozzles, or other smaller accessories, are conventionally connected to the bit by threaded connections. Threaded connections include many stress risers that may increase the risk of fracture in brittle materials.

SUMMARY

In some embodiments, a downhole tool may include a body with a first material. The body may include at least one bore, the bore having a plurality of lateral recesses. At least one connection member may be placed within the plurality of lateral recesses, and an accessory may be fastened to the connection member within the bore. In some embodiments, the lateral recess may include a radially inward taper. In some embodiments, the body may be formed from a metal matrix composite, the accessory connection may be formed from tool steel and the connection member may be formed from quench tempered steel.

In other embodiments, a cutting tool may include a body including at least one bore, the bore having a plurality of lateral recesses. The lateral recesses may include a rectangular lateral cross-section and a radially inward taper. In some embodiments, the bore may be continuous through the body.

In yet other embodiments, a method for fixing an attachment to a body may include providing a body that includes a bore, and the bore includes a plurality of lateral recesses. The method may also include inserting at least one connection member into the plurality of lateral recesses and installing an accessory in the bore by rotating the accessory in the connection member. In some embodiments, the accessory may be rotated with a torque greater than 25 ft-lbf. (33.9 N-m). In other embodiments, the connection member may pinch the accessory connection.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 4-1 through FIG. 4-5 are cross-sectional views of a bore having various placements of lateral recesses, according to at least one embodiment of the present disclosure;

FIG. 5-1 is a longitudinal cross section of a body showing at least one connection member in a lateral recess, according to at least one embodiment of the present disclosure;

FIG. 5-2 is a longitudinal cross section of a body showing at least one connection member in a lateral recess, according to at least one embodiment of the present disclosure;

FIG. 5-3 is a longitudinal cross section of a body showing an accessory inserted into a bore, according to at least one embodiment of the present disclosure;

FIG. 7-1 is a plan view of a plurality of connection members connected by a flexible connector, according to at least one embodiment of the present disclosure;

FIG. 7-2 is another plan view of a plurality of connection members connected by a flexible connector, according to at least one embodiment of the present disclosure;

DETAILED DESCRIPTION

This disclosure generally relates to devices, systems, and methods for fixing or attaching an accessory to a body. In some embodiments, the body may be a downhole tool. In other embodiments, the body may be part of a cutting tool. The accessory may be positioned at least partially within the body and coupled to the body.

Figure 1:
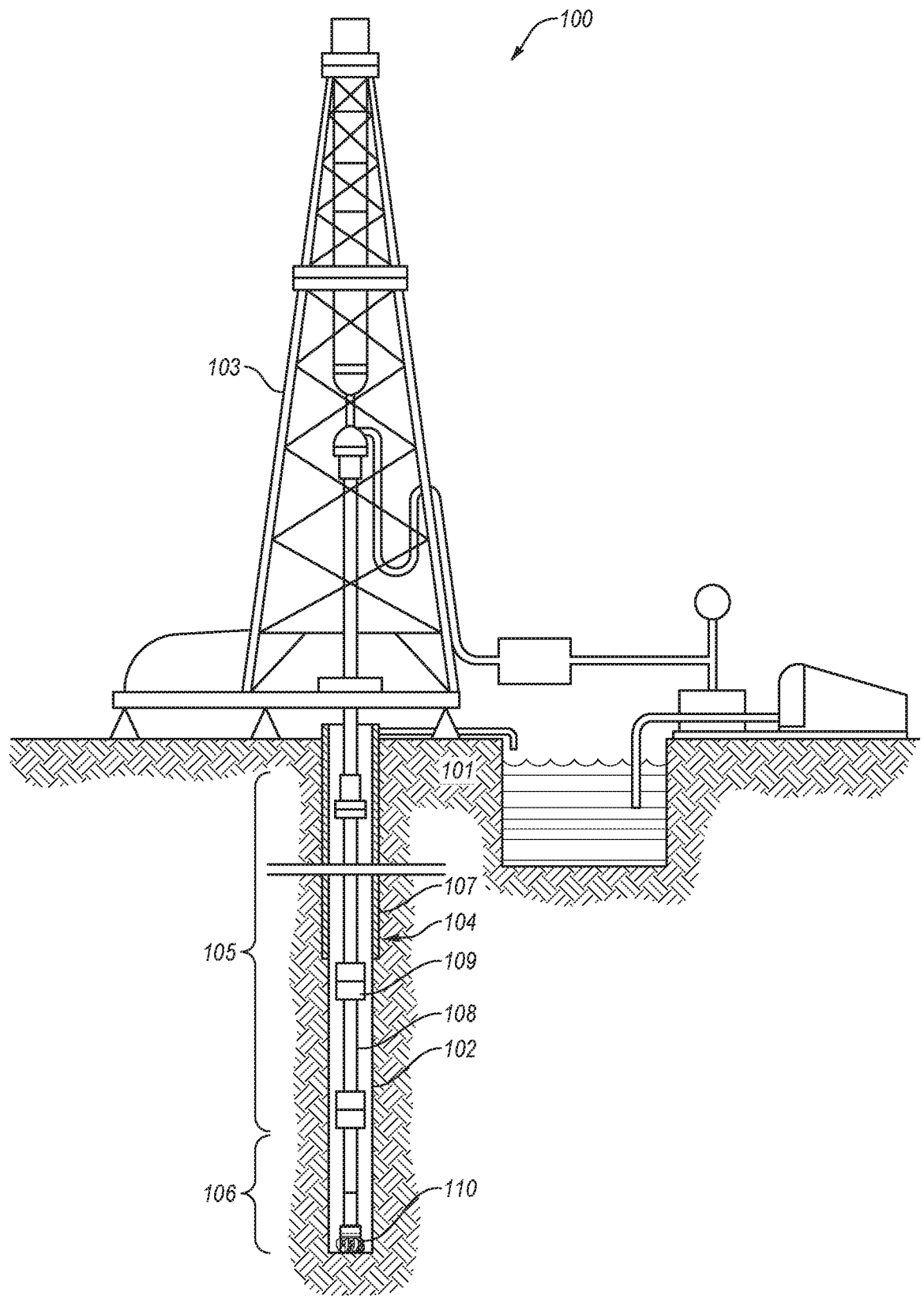
FIG. 1 is a general schematic of a drilling system, according to at least one embodiment of the present disclosure.

FIG. 1 shows one example of a drilling system 100 for drilling an earth formation 101 to form a wellbore 102. The drilling system 100 includes a drill rig 103 used to turn a drilling tool assembly 104 which extends downward into the wellbore 102. The drilling tool assembly 104 may include a drill string 105, a bottomhole assembly ("BHA") 106, and a bit 110, attached to the downhole end of drill string 105.

The drill string 105 may include several joints of drill pipe 108 connected end-to-end through tool joints 109. The drill string 105 transmits drilling fluid through a central bore and transmits rotational power from the drill rig 103 to the BHA 106. In some embodiments, the drill string 105 may further include additional components such as subs, pup joints, etc. The drill pipe 108 provides a hydraulic passage through which drilling fluid is pumped from the surface. The drilling fluid discharges through selected-size nozzles, jets, or other orifices in the bit 110 for the purposes of cooling the bit 110 and cutting structures thereon, and for lifting cuttings out of the wellbore 102 as it is being drilled.

The BHA 106 may include the bit 110 or other components. An example BHA 106 may include additional or other components (e.g., coupled between to the drill string 105 and the bit 110). Examples of additional BHA components include drill collars, stabilizers, measurement-while-drilling ("MWD") tools, logging-while-drilling ("LWD") tools, downhole motors, underreamers, section mills, hydraulic disconnects, jars, vibration or dampening tools, other components, or combinations of the foregoing.

In general, the drilling system 100 may include other drilling components and accessories, such as special valves (e.g., kelly cocks, blowout preventers, and safety valves). Additional components included in the drilling system 100 may be considered a part of the drilling tool assembly 104, the drill string 105, or a part of the BHA 106 depending on their locations in the drilling system 100.

The bit 110 in the BHA 106 may be any type of bit suitable for degrading downhole materials. For instance, the bit 110 may be a drill bit suitable for drilling the earth formation 101. Example types of drill bits used for drilling earth formations are fixed-cutter or drag bits. In other embodiments, the bit 110 may be a mill used for removing metal, composite, elastomer, other materials downhole, or combinations thereof. For instance, the bit 110 may be used with a whipstock to mill into casing 107 lining the wellbore 102. The bit 110 may also be a junk mill used to mill away tools, plugs, cement, other materials within the wellbore 102, or combinations thereof. Swarf or other cuttings formed by use of a mill may be lifted to surface, or may be allowed to fall downhole.

Figure 2:
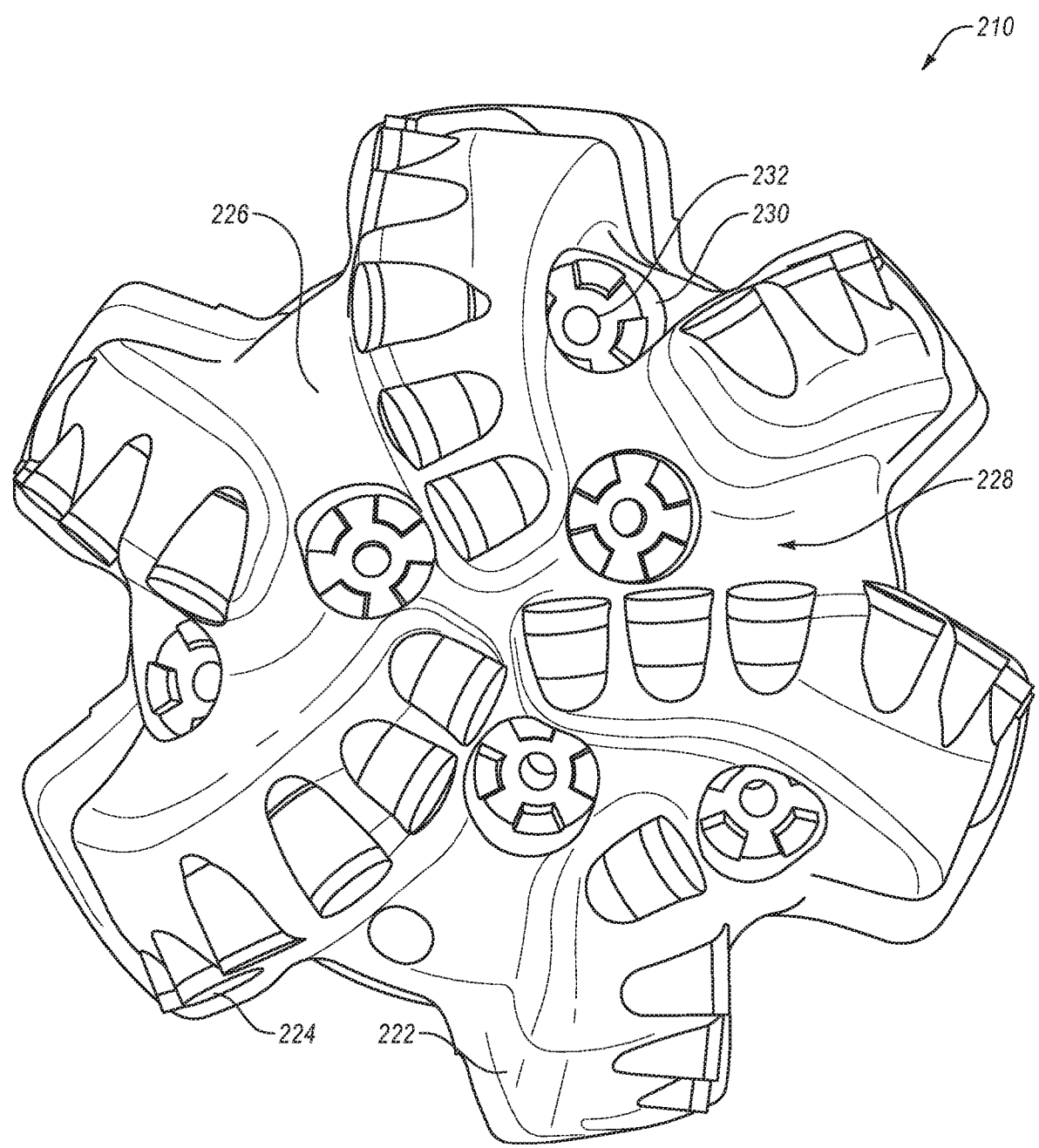
FIG. 2 is a perspective view of a drill bit, according to at least one embodiment of the present disclosure.

FIG. 2 is a perspective view of the downhole end of an embodiment of a bit 210. The bit 210 may include a bit body 226 from which a plurality of blades 222 may protrude. At least one of the blades 222 may have a plurality of cutting elements 224 connected thereto. In some embodiments, at least one of the cutting elements 224 may be a planar cutting element, such as a shear cutting element. In other embodiments, at least one of the cutting elements 224 may be a non-planar cutting element, such as a conical cutting element (e.g., STINGER cutting elements) or a ridged cutting element.

The bit blade 222 may be attached to the bit body 226. In some embodiments, the bit blade 222 may be manufactured as one piece with the bit body 226. In other embodiments, the bit blade 222 may be manufactured separately from the bit body 226. The separate bit blade 222 may then be permanently or removably attached to the bit body 226.

In some embodiments, the bit body 226 and the bit blades 222 may be manufactured from an erosion-resistant material such as tungsten carbide (WC). The cutting elements 224 may be manufactured from an ultra-hard material such as polycrystalline diamond (PCD). In other embodiments, the bit body 226 and at least part of the bit blades 222 may be manufactured from a steel alloy. The cutting elements 224 may be embedded in a WC base affixed to the bit blades 222.

In some embodiments, the space between two bit blades 222 may include a junk slot 228, through which cuttings and drilling mud may pass during drilling. In some embodiments, a port 230 may allow drilling mud to flow through the bit 212 into the junk slot 228 from the drill string. The port 230 may include a nozzle 232, which directs the flow of the drilling mud. In some embodiments, the nozzle 232 may be installed directly in the bit body 226. In other embodiments, the nozzle 232 may be installed in a WC insert, embedded in the bit body 226.

Figure 3:
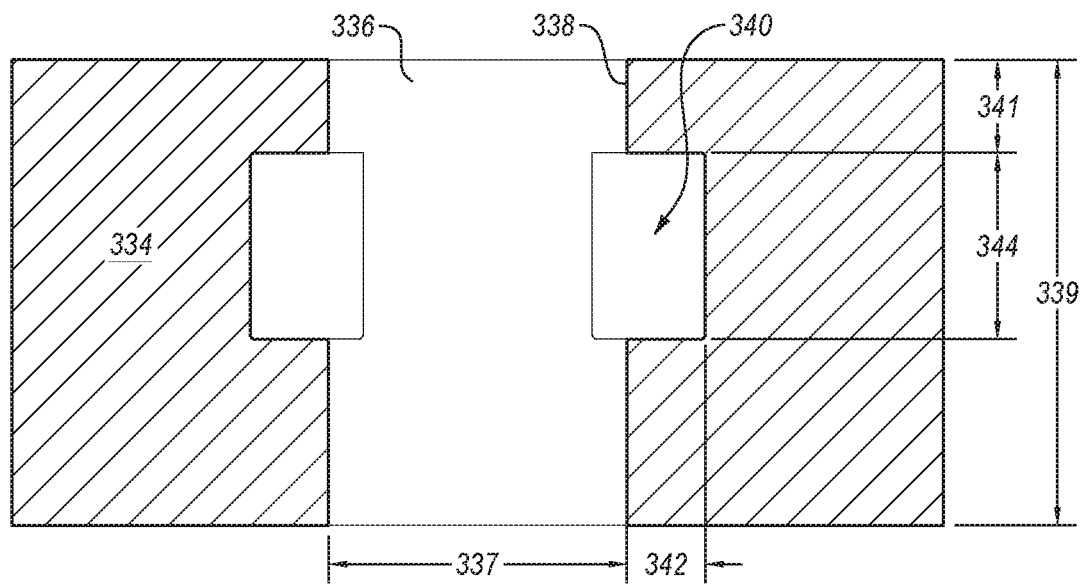
FIG. 3 is a longitudinal cross section of a body showing a bore and lateral recesses, according to at least one embodiment of the present disclosure.

Referring now to FIG. 3, in some embodiments a body 334 may include a bore 336. The body 334 may be part of the bit body, the bit blade, or a different portion of a downhole tool or cutting tool. The bore 336 has an inner surface 338. In some embodiments, the inner surface 338 may include a lateral recess 340. In some embodiments, the lateral recess 340 may have a radial depth 342 in a range having an upper value, a lower value, or upper and lower values including any of 0.10 in. (2.54 mm), 0.20 in. (5.08 mm), 0.30 in. (7.62 mm), 0.40 in. (10.16 mm), 0.50 in. (12.72 mm), 0.60 in. (15.24 mm), 0.70 in. (17.78 mm), 0.80 in. (20.32 mm), 0.90 in. (22.86 mm), 1.0 in. (25.40 mm), or any values therebetween. For example, the radial depth 342 may be greater than 0.10 in. (2.54 mm). In other examples, the radial depth 342 may be less than 1.0 in. (25.40 mm). In yet other examples, the radial depth 342 may be in a range of 0.10 in. (2.54 mm) to 1.0 in. (25.40 mm).

In some embodiments, the lateral recess 340 may have a recess height 344 in a range having an upper value, a lower value, or upper and lower values including any of 0.10 in. (2.54 mm), 0.20 in. (5.08 mm), 0.30 in. (7.62 mm), 0.40 in. (10.16 mm), 0.50 in. (12.72 mm), 0.60 in. (15.24 mm), 0.70 in. (17.78 mm), 0.80 in. (20.32 mm), 0.90 in. (22.86 mm), 1.0 in. (25.40 mm), or any values therebetween. For example, the recess height 344 may be greater than 0.10 in. (2.54 mm). In other examples, the recess height 344 may be less than 1.0 in. (25.40 mm). In yet other examples, the recess height 344 may be in a range of 0.10 in. (2.54 mm) to 1.0 in. (25.40 mm).

In some embodiments, the lateral recess 340 may have a longitudinal depth 341 below an outer surface of the body 334 in a range having an upper value, a lower value, or upper and lower values including any of 0.00 in. (0.00 mm), 0.25 in. (6.35 mm), 0.50 in. (12.70 mm), 0.75 in. (19.05 mm), 1.0 in. (25.40 mm), 1.25 in. (31.75 mm), 1.50 in. (38.10 mm), 1.75 in. (44.45 mm), 2.0 in. (50.80 mm), or any values therebetween. For example, the longitudinal depth 341 may be greater than 0.00 in. (0.00 mm). In other examples, the longitudinal depth 341 may be less than 2.0 in. (50.80 mm). In yet other examples, the longitudinal depth 341 may be in a range of 0.00 in. (0.00 mm) to 2.0 in. (50.80 mm).

In some embodiments, the bore 336 may have a bore diameter 337 in a range having an upper value, a lower value, or upper and lower values including any of 0.50 in. (1.27 cm), 0.75 in. (1.91 cm), 1.0 in. (2.54 mm), 2.0 in. (5.08 cm), 3.0 in. (7.62 cm), 4.0 in. (10.16 cm), 5.0 in. (12.7 cm), 6.0 in. (15.24 cm) or any values therebetween. For example, the bore diameter 337 may be greater than 0.50 in. (1.27 cm). In other examples, the bore diameter 337 may be less than 6.0 in. (15.24 cm). In yet other examples, the bore diameter 337 may be in a range of 0.50 in. (1.27 cm) to 6.0 in. (15.24 cm).

In some embodiments, the bore 336 may have a bore depth 339 in a range having an upper value, a lower value, or upper and lower values including any of 0.50 in. (1.27 cm), 0.75 in. (1.91 cm), 1.0 in. (2.54 mm), 2.0 in. (5.08 cm), 3.0 in. (7.62 cm), 4.0 in. (10.16 cm), 5.0 in. (12.7 cm), 6.0 in. (15.24 cm) or any values therebetween. For example, the bore depth 339 may be greater than 0.50 in. (1.27 cm). In other examples, the bore depth 339 may be less than 6.0 in. (15.24 cm). In yet other examples, the bore depth 339 may be in a range of 0.50 in. (1.27 cm) to 6.0 in. (15.24 cm). In still other examples, the bore depth 339 may be less than 0.50 in. (1.27 cm) or greater than 6.0 in. (15.24 cm). For instance, the bore depth 339 may be between 6.0 in. (15.24 cm) and 20 in. (50.80 cm)

Figures 1, 4:
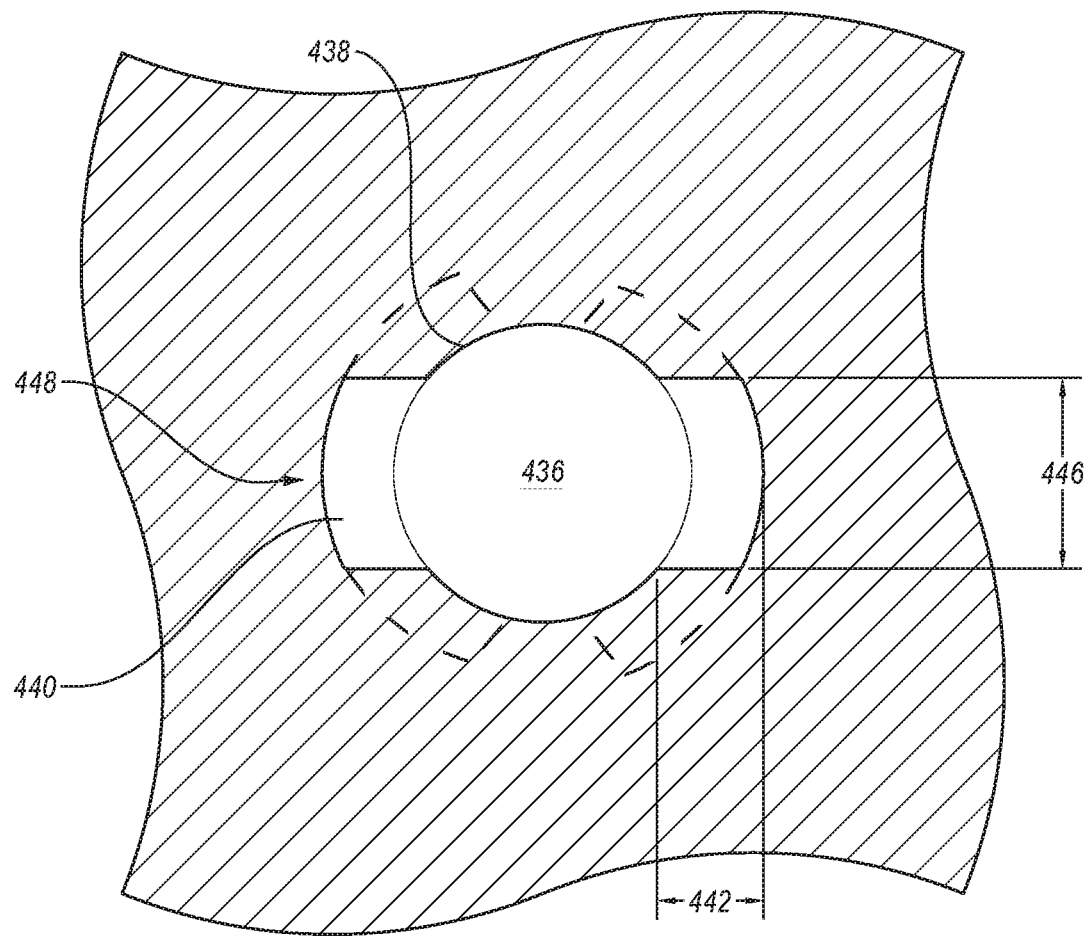
Figures 2, 4:
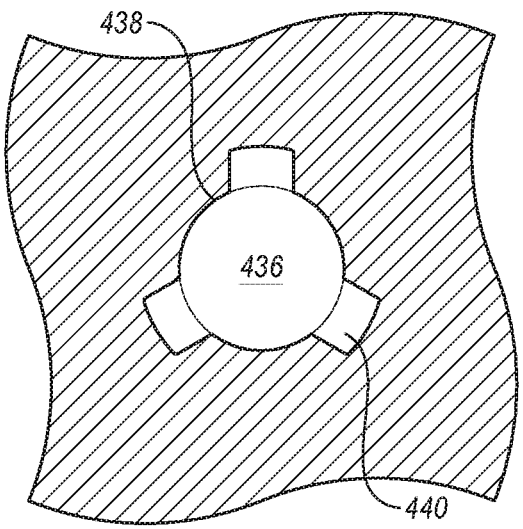
Figures 3, 4:
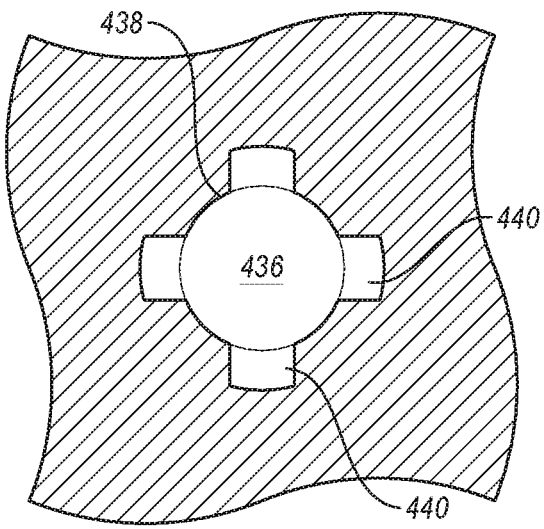
Figure 4:
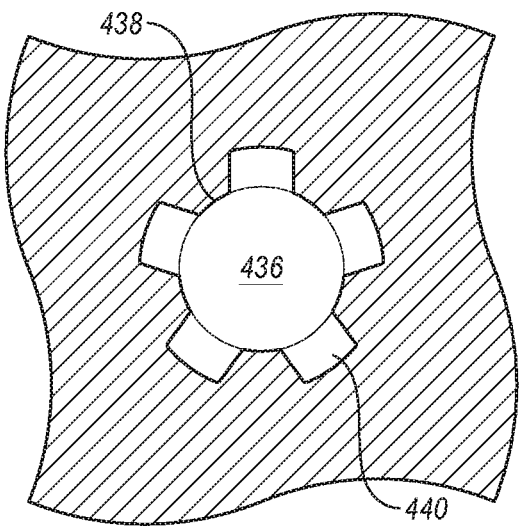

FIG. 4-1 is a top cross-sectional view of a bore 436 having an inner surface 438. The bore 436 may include a lateral recess 440 having a radial depth 442. In some embodiments, the lateral recess 440 may have a length 446 (measured across the circumference) in a range having an upper value, a lower value, or upper and lower values including any of 0.10 in. (2.54 mm), 0.20 in. (5.08 mm), 0.30 in. (7.62 mm), 0.40 in. (10.16 mm), 0.50 in. (12.72 mm), 0.60 in. (15.24 mm), 0.70 in. (17.78 mm), 0.80 in. (20.32 mm), 0.900 in. (22.86 mm), 1.0 in. (25.40 mm), or any values therebetween. For example, the length 446 may be greater than 0.10 in. (2.54 mm). In other examples, the length 446 may be less than 1.0 in. (25.40 mm). In yet other examples, the length 446 may be in a range of 0.10 in. (2.54 mm) to 1.0 in. (25.40 mm). For instance, for a larger bore (see FIG. 8), the length 446 may be significantly more than 1.0 in. (25.40 mm). By way of example, the circumferential length may be between 1.0 in. (2.54 cm and 15 in. (38.1 cm).

The length 446 may be less than the diameter of the bore 436 (e.g., between 25% and 85%, between 35% and 95%, or between 50% and 99% of the diameter of the bore 426), but may also be equal to or greater than the diameter of the bore 436. For instance, as illustrated by the dashed lines, a lateral recess 440 may have a length 446 at least equal to the diameter of the bore 426. In an example, embodiment, the length 446 of the lateral recess 440 may be between 100% and 125% or between 105% and 150% of the diameter of the bore 436. It should also be appreciated in view of the disclosure herein that these ranges are illustrative and may be combined. Accordingly, for at least some embodiments, the length 446 may be between 25% and 150% of the diameter of the bore 436, or have any upper or lower limit therebetween. In other embodiments, the length 446 may be less than 25% or more than 150% of the diameter of the bore 436.

Figures 4, 5:
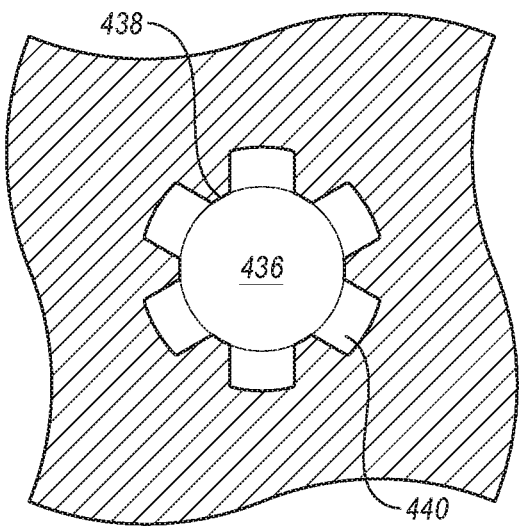
Figures 1, 5:
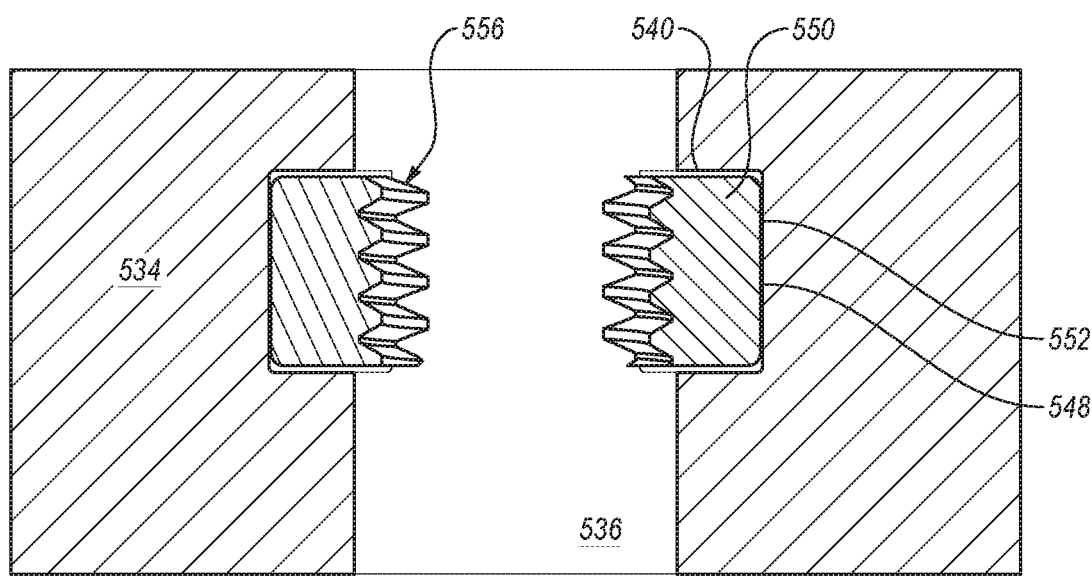
Figures 2, 5:
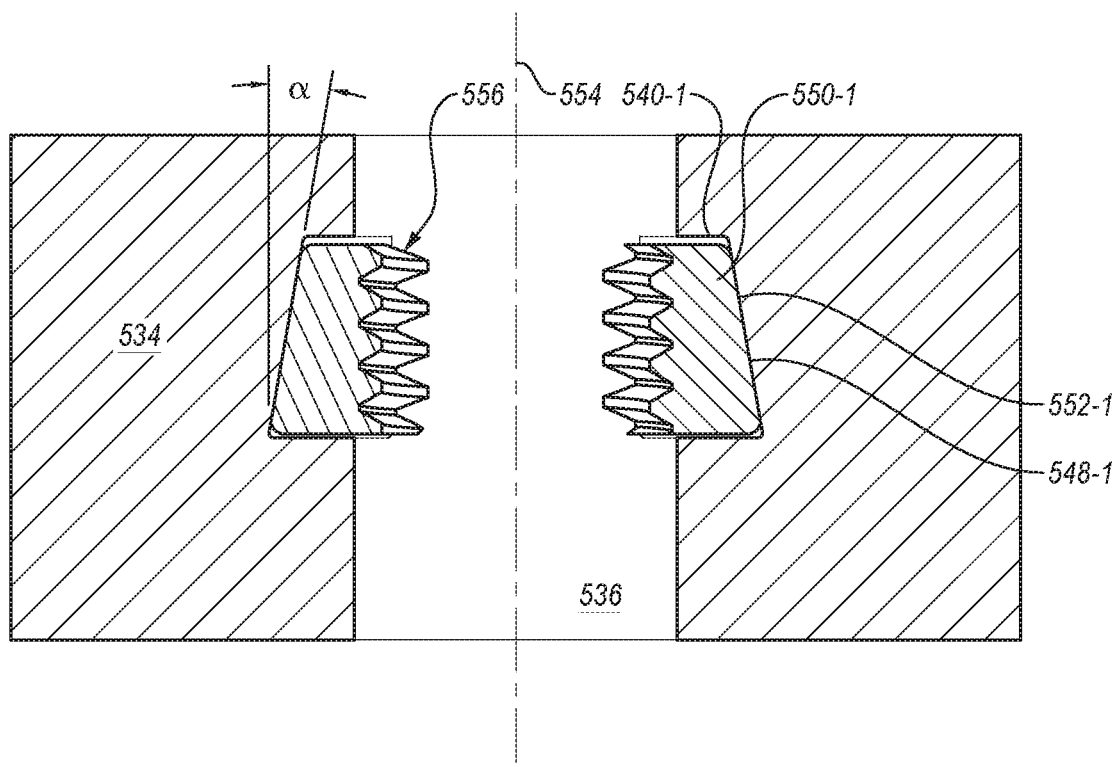
Figures 3, 5:
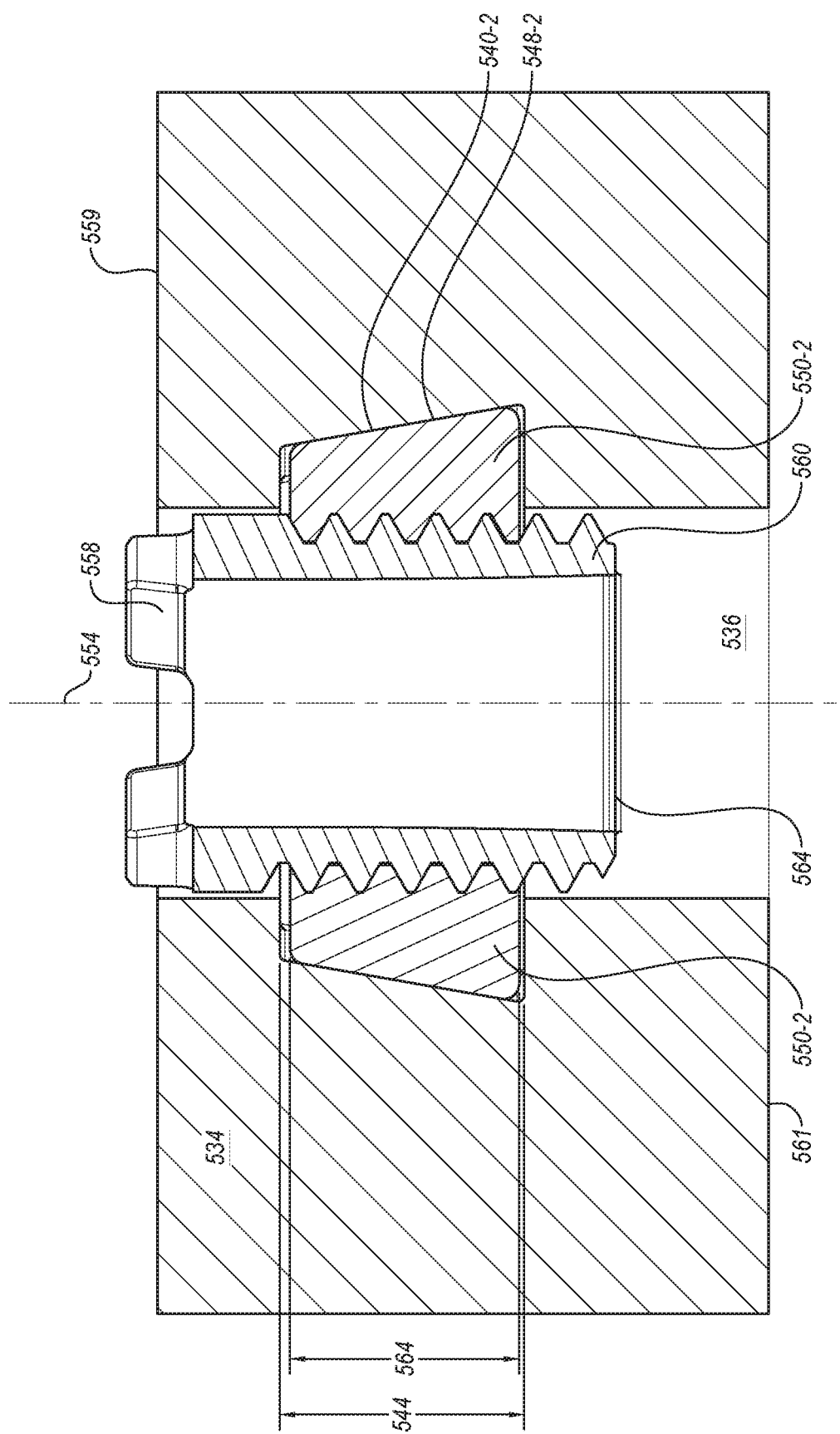

In some embodiments, the bore 436 includes more than one lateral recess 440. In some embodiments, there are two lateral recesses 440, as shown in FIG. 4-1. FIG. 4-2 to FIG. 4-5 illustrate embodiments of three, four, five, or six lateral recesses 440 in a bore 436. In other embodiments, more than six lateral recesses 440 are included in the bore 436. In some embodiments, the lateral recesses 440 may be spaced evenly around the circumference of the bore 436. For example, two lateral recesses 440 may be diametrically opposed from each other. In another example, three lateral recesses 440 may be spaced 120° apart from each other. In still another example, six lateral recesses 440 may be spaced 60° apart from each other. Yet other examples include any number of lateral recesses 440 spaced evenly around the bore 436.

In other embodiments, the lateral recesses may be spaced unevenly around the bore. For example, two lateral recesses may be located at 0° and 90°. In other examples, three lateral recesses may be located at 0°, 45°, and 200°. In still other examples, five lateral recesses may be located at 0°, 57°, 120°, 213°, and 300°.

Referring to FIG. 4-1, in some embodiments, the lateral recess 440 has a generally rectangular lateral cross-section. In other embodiments, the lateral recess 440 has a non-rectangular lateral cross-section. For example, the lateral recess 440 may have a triangular lateral cross-section, a trapezoidal lateral cross-section, or a semicircular lateral cross-section. In other embodiments, the lateral recess 440 may have a recess surface 448 that is concave toward the bore 436 in transverse cross-section. In still other embodiments, the lateral recess 440 may have a recess surface 448 that is approximately parallel to the inner surface 438 in transverse cross-section.

Referring now to FIG. 5-1, in some embodiments, a connection member 550 may be inserted into the lateral recess 540. In some embodiments, the connection member 550 includes a threaded connection 556, and more particularly may include a partial thread segment that extends around a portion of a circumference. In some embodiments, the threaded connection 556 may be a standard API fine-thread threaded connection. In other embodiments, the threaded connection 556 may be a coarse-thread threaded connection. In still other embodiments, the threaded connection 556 may include a non-standard threaded connection. For example, the threaded connection 556 may be a reverse threaded connection. In yet other embodiments, the connection member 550 may include another type of mechanical interlock or connection. For example, the connection member may include a twist lock, pin lock, a friction lock, or any other mechanical connection.

In some embodiments, the body 534 may be manufactured using additive manufacturing. In some embodiments, the bore 536 may be formed in the body 534 during additive manufacturing. In some embodiments, the lateral recess 540 may be formed in the bore 536 during additive manufacturing. In other embodiments, the bore 536 and the lateral recess 540 may be cast with the body 534. For example, the bore 536 and lateral recess 540 may be cast using a consumable portion of a mold. In still other embodiments, the bore 536 and the lateral recess 540 may be machined into the body 534 after additive manufacturing or casting.

In some embodiments, the connection member 550 may be additively manufactured into the lateral recess 540 simultaneously with additive manufacturing of the body 534. In some embodiments, simultaneously additively manufacturing the connection member 550 with the body 534 may cause thermal breakdown of the connection member material, thereby reducing the strength of the connection member.

In other embodiments, the connection member 550 may be manufactured separately from the body 534. For example, the connection member 550 may be manufactured by cutting a pre-fabricated nut to the required size and shape. In other examples, the connection member 550 may be manufactured by tapping threads into a cylinder and cutting the tapped cylinder to the required size and shape. Other examples include machining a cylinder with the required connection and taper. Still other examples include creating a cast with the required shape and threads and casting the connection member 550. Yet other examples include additively manufacturing the connection member 550 into the required shape.

In some embodiments, the connection member 550 is removably positioned within the lateral recess 540. In some embodiments, the connection member 550 may be placed in the lateral recess 540 without any adhesive or mechanical attachment prior to installation of an accessory. For example, the connection member 550 may be inserted into the lateral recess 540 and held in place during operation of the tool by an inserted accessory. In other examples, the connection member 550 may include a light adhesive on the outer surface 552 that removably adheres the connection member 550 to the recess surface 548. In other embodiments, the connection member 550 may be permanently, or semi-permanently affixed to the lateral recess 540. For example, the connection member 550 may be brazed to the lateral recess 540. In other examples, the connection member 550 may be bolted to the lateral recess 540.

The connection member 550 may have an outer surface 552 oriented toward a recess surface 548. In some embodiments, the outer surface 552 may be complementarily shaped to the recess surface 548 of the lateral recess 540. For example, referring to FIG. 5-2, in some embodiments the recess surface 548-1 may include a taper, which tapers radially inward toward the longitudinal axis 554 of the bore 536. In some embodiments, the connection member 550-1 may be a partial thread segment having an outer surface 552-1 with the same or similar taper to the recess surface 548-1. In other embodiments, the lateral recess 540-1 may have a recess surface 548-1 that includes a radially inward taper, and the connection member 550-1 may have an outer surface 552-1 that does not include a radially inward taper.

In some embodiments, the connection member 550-1 may have an outer surface 552-1 that has the same or similar shape as the recess surface 548-1. For example, both the recess surface 548-1 and the outer surface 552-1 may be convex toward the bore 536. In other examples, both the connection member 550-1 and the lateral recess 540-1 may have a triangular or semicircular lateral cross-section. In other embodiments, the recess surface 548-1 and the outer surface 552-1 may not be complementarily shaped. For example, the recess surface 548-1 may have a rectangular lateral cross-section, and the outer surface 552-1 may have a semicircular lateral cross-section.

The radially inward taper has a taper angle $\alpha$. In some embodiments, the taper angle $\alpha$ may be in a range having an upper value, a lower value, or upper and lower values including any of 0°, 1°, 2°, 3°, 4°, 5°, 6°, 7°, 8°, 9°, 10°, 11°, 12°, 13°, 14°, 15°, 20°, 35°, 30°, 35°, 40°, 45°, or any values therebetween. For example, the taper angle $\alpha$ may be greater than 0°. In other examples, the taper angle $\alpha$ may be less than 45°. In yet other examples, the taper angle $\alpha$ may be in a range of 0° to 45°.

In some embodiments, each lateral recess may have a similar taper. In other embodiments, lateral recesses may have different tapers. For example, a set of three lateral recesses may have a taper of 5°, 7°, and 7°. In other examples, a set of five lateral recesses may have a taper of 0°, 1°, 5°, 5° and 12°. In yet other examples, a set of two lateral recesses may have a taper of 9° and 15°.

Referring now to FIG. 5-3, in some embodiments an accessory 558 may be inserted into the bore 536. The accessory 558 may include an accessory connection 560. The accessory connection 560 may be complementary to the connection member 550-2, which is illustrated as a partial thread segment. In some embodiments, the accessory connection 560 and the connection member 550-2 may include a matching threaded connection. The accessory 558 may then be fixed within the bore 536 by rotating the accessory connection 560 within the connection member 550-2. The lateral recess 540-2 may prevent movement of the connection member 550-2 when a torque is applied to the accessory 558.

In some embodiments, the bore 536 may be continuous through the body 534 from an outer surface 559 of the body 534 to an opposing surface 561 of the body 534. For example, the opposing surface 561 may be an inner surface of a hydraulic conduit through the body 534, and the bore 534 may provide fluid communication with the hydraulic conduit. In other examples, the opposing surface 561 may be an opposite side of a blade, a connector, an arm, or other portion of a downhole tool.

In some embodiments, the bore 536 may include a sealing ring 564. In some embodiments, the sealing ring 564 may be included at the bottom of the lateral recess 540 to prevent fluid from entering the lateral recess 540 from inside the body. In other embodiments, the sealing ring 564 may be included at the top of the lateral recess 540 to prevent fluid from entering the lateral recess 540 from outside the body. In some embodiments, a sealing ring 564 may be included in both the top and bottom of the lateral recess to seal the lateral recess 540 from outside fluid penetration. In some embodiments, the bore 536 may include a specially fabricated sealing ring seat at the top and/or bottom of the lateral recess 540 in which the sealing ring 564 may be included. In other embodiments, the sealing ring 564 may be attached to the accessory and configured to seal against the wall of the bore.

In some embodiments, the connection member 550-2 may have a connection member height 564 that is approximately the same as the recess height 544. In other embodiments, the connection member 550-2 may have a connection member height 564 that is less than the recess height 544. In some embodiments, as the accessory 558 and accessory connection 560 are rotated within the bore 536, the threads from the accessory connection 560 may engage with the threads from the connection member 550-2. As the threads engage, the connection member 550-2 may be drawn up within the lateral recess 540-2. In some embodiments, the upward progress of the connection member 550-2 may be stopped by contact with the body 534. In some embodiments, as the connection member 550-2 is drawn upward, the contact of the connection member 550-2 with the tapered recess surface 548-2 may push the connection member 550-2 radially inward toward the longitudinal axis 554 of the bore 536. In some embodiments, the radially inward motion of the connection member 550-2 may cause the connection member 550-2 to apply a radially inward force on the accessory 558. For example, a connection member 550-2 may apply a radially inward force on the accessory 558 such that the accessory 558 is firmly seated within the bore 536, thereby reducing any motion, vibration, or loosening of connection that may be caused during operation.

In some embodiments, a plurality of connection members 550-2 may all apply a radially inward force on the accessory 558. For example, two diametrically opposite connection members 550-2 may pinch the accessory 558, thereby reducing any motion, vibration, or loosening of connection that may be caused during operation. In other examples, three, four, five, or six evenly spaced connection members 550-2 may pinch the accessory 558.

In some embodiments, a plurality of unevenly sized connection members 550-2 may be inserted in the plurality of lateral recesses 540. For example, if an asymmetrical load is applied to the body 534 and/or the accessory 558, a larger connection member could be placed opposite the largest of the asymmetrical forces to provide greater support at the accessory 558. In other embodiments, a plurality of connection members 550-2 may be placed asymmetrically around the bore 536. For example, if an asymmetrical load is applied to the body 534 and/or the accessory 558, a plurality of connection members 540 may be placed closer together opposite the largest of the asymmetrical loads, thereby providing additional support for the accessory 558. In still other embodiments, a combination of unevenly sized connection members and unevenly placed connection members may be placed opposite greater loads to provide support for the accessory 558.

Figure 6:
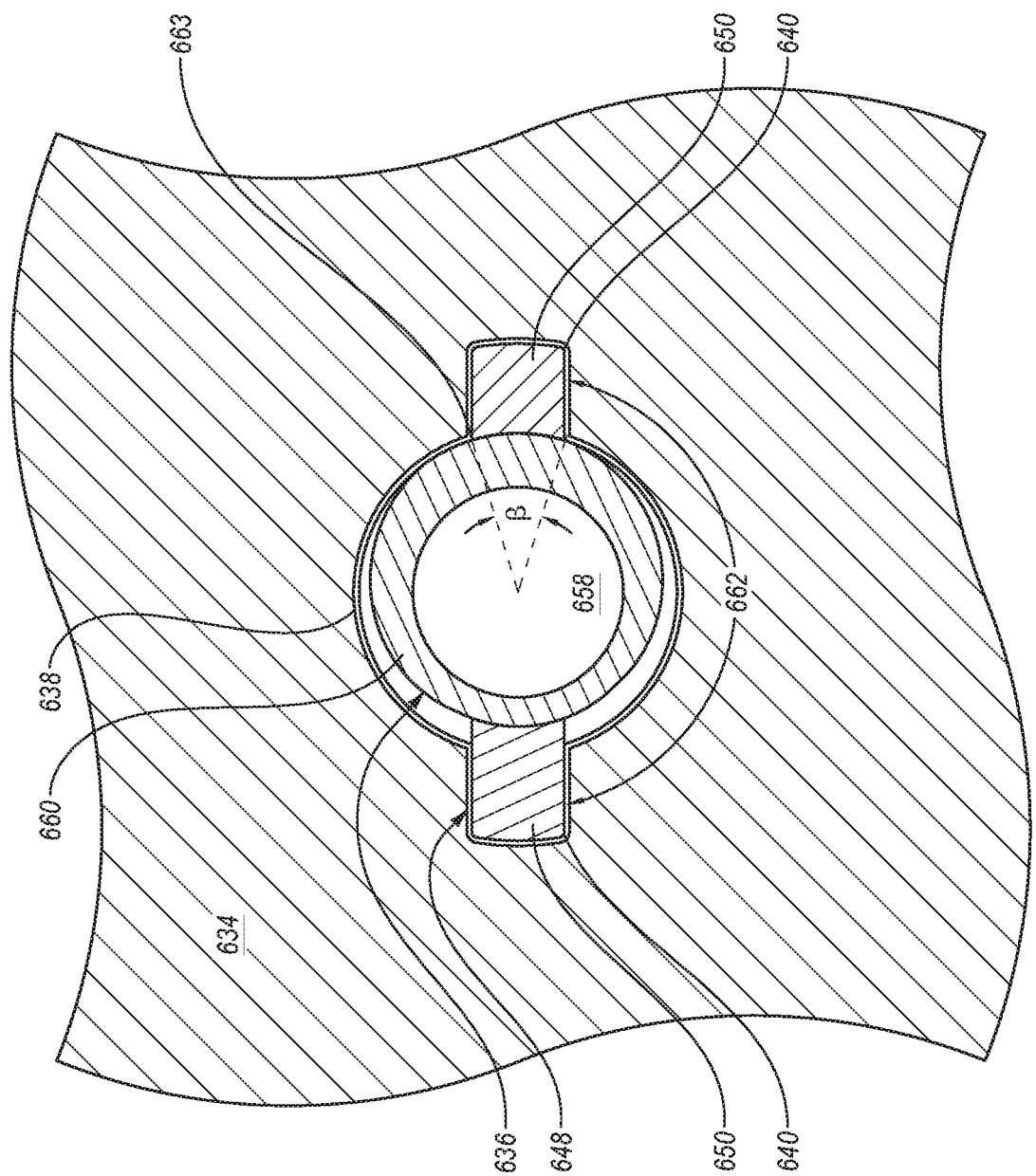
FIG. 6 is a longitudinal cross section of a body showing at least one connection member in a lateral recess, according to at least one embodiment of the present disclosure.

Referring now to FIG. 6, in some embodiments, the connection members 650 may remain stationary when a torque is applied to the accessory 658. For example, the connection members 650 may be partial thread segments extending around a portion of the circumference of the bore 636. In a standard threaded connection, if a torque (e.g., clockwise) is applied to the accessory 658, the contact and/or friction from the accessory connection's threads may apply a lateral force on the connection member 650.

In some embodiments, a lateral recess 640 may have a sidewall 663 in a rotational direction relative to the bore 636. The connection member 650 may receive the lateral force from the accessory connection and be compressed against the sidewall 663. The sidewall 663 may resist the compression and limit and/or prevent the movement of the connection member 650 relative to the lateral recess 640. In other embodiments, the connection member 650 may be fixed to the recess surface 648 and/or sidewall 663 with an adhesive, a braze, a weld, a mechanical fastener, or combinations thereof. In this manner, the accessory 658 may be tightened until a desired torque is reached.

In some embodiments, the accessory 658 may be tightened with a torque that may be in a range having an upper value, a lower value, or upper and lower values including any of 15 ft-lbf. (20.3 N-m), 20 ft-lbf. (27.1 N-m), 25 ft-lbf. (33.9 N-m), 30 ft-lbf. (40.7 N-m), 35 ft-lbf. (47.4 N-m), 40 ft-lbf. (54.2 N-m), 45 ft-lbf. (61.0 N-m), 50 ft-lbf. (67.8 N-m), 55 ft-lbf. (74.5 N-m), 60 ft-lbf. (81.3 N-m), or any values therebetween. For example, the accessory 658 may be tightened with a torque that may be greater than 15 ft-lbf. (20.3 N-m). In other examples, the accessory 658 may be tightened with a torque that may be less than 60 ft-lbf. (81.3 N-m). In yet other examples, the accessory 658 may be tightened with a torque that may be in a range of 15 ft-lbf. (20.3 N-m) to 60 ft-lbf. (81.3 N-m).

In other embodiments, the accessory 658 may be a larger accessory, such as a pin connector, which may be tightened with a torque in a range having an upper value, a lower value, or upper and lower values including any of 5,000 ft-lbf. (6.78 kN-m), 7,500 ft-lbf. (10.2 kN-m), 10,000 ft-lbf. (13.6 kN-m), 12,500 ft-lbf. (16.9 kN-m), 15,000 ft-lbf. (20.3 kN-m), or any values therebetween. For example, the accessory 658 may be tightened with a torque greater than 5,000 ft-lbf. (6.78 kN-m). In other examples, the accessory 658 may be tightened with a torque less than 15,000 ft-lbf. (20.3 kN-m). In yet other examples, the accessory 658 may be tightened with a torque between 5,000 ft-lbf. (6.78 kN-m) and 15,000 ft-lbf. (20.3 kN-m). In still other examples, the accessory 658 may be tightened with a torque less than 5,000 ft-lbf. (6.78 kN-m) or greater than 15,000 ft-lbf. (20.3 kN-m). For instance, up to 20,000 ft-lbf. (27.1 kN-m), 30,000 ft-lbf (40.7 kN-m), 35,000 ft-lbf (47.5 kN-m), or greater torque may be used in some embodiments.

In other examples, if a counterclockwise torque is applied to the accessory 658, the contact from accessory connection's threads may apply a lateral force on the connection member 650. The connection member 650 will remain stationary upon contact with the sidewall 663. In this manner, the accessory 658 may be loosened until the accessory 658 is no longer bound by the connection member 650.

In some embodiments, a plurality of connection members 650 may be inserted into a plurality of lateral recesses 640. For example, two connection members 650 may be inserted into two lateral recesses 640. In other examples, five connection members 650 may be inserted into five lateral recesses 640. In still other examples, three connection members 650 may be inserted into six lateral recesses 640. Yet other examples include two connection members 650 inserted into three lateral recesses 640.

In some embodiments, the connection member 650 may engage the accessory connection's threads with a circumference degree $\beta$. The circumference degree $\beta$ may be in a range having an upper value, a lower value, or upper and lower values including any of 30°, 60°, 90°, 120°, 150°, 180°, 210°, 240°, 270°, 300°, or any values therebetween. For example, the circumference degree $\beta$ may be greater than 30°. In other examples, the circumference degree $\beta$ may be less than 300°. In yet other examples, the circumference degree $\beta$ may be in a range of 30° to 300°, such as between 90° and 180°, or between 105° and 150° as shown by the example in dashed lines in FIG. 4-1.

In some embodiments, a plurality of connection members may have the same circumference degree $\beta$. In other embodiments, a plurality of connection members may have different circumference degrees $\beta$. For example, three connection members may engage the accessory connection's threads with circumference degrees $\beta$ of 30°, 75°, and 200°. In other examples, two connection members may engage the accessory connection with circumference degrees $\beta$ of 100° and 30°. In still other examples, five connection members may engage the accessory connection with circumference degrees $\beta$ of 30°, 30°, 45°, 55°, and 90°.

In some embodiments, a plurality of connection members may have a combined circumference degree (i.e., the sum of the circumference degree $\beta$ of all connection members). The combined circumference degree may be in a range having an upper value, a lower value, or upper and lower values including any of 60°, 90°, 120°, 150°, 180°, 210°, 240°, 270°, 300°, or any values therebetween. For example, the combined circumference degree may be greater than 60°. In other examples, the combined circumference degree may be less than 330°. In yet other examples, the combined circumference degree may be in a range of 60° to 330°, 60° and 300°, or 90° and 270°.

In some embodiments, there is be a lateral recess bridge 662, which may include solid material between adjacent lateral recesses 640. The lateral recess bridge 662 may have an arc length in a range having an upper value, a lower value, or upper and lower values including any of 0.10 in. (2.5 mm), 0.20 in. (5.1 mm), 0.30 in. (7.6 mm), 0.40 in. (10.2 mm), 0.50 in. (12.7 mm), 0.60 in. (15.2 mm), 0.70 in. (17.8 mm), 0.80 in. (20.3 mm), 0.90 in. (22.9 mm), 1.0 in. (25.4 mm), 2.0 in. (50.8 mm), 3.0 in. (76.2 mm), 4.0 in. (101.6 mm), 5.0 in. (127.0 mm), 6.0 in. (152.4 mm), or any values therebetween. For example, the lateral recess bridge 662 may have an arc length greater than 0.10 in. (2.5 mm). In other examples, the lateral recess bridge 662 may have an arc length less than 6.0 in. (152.4 mm). In yet other examples, the lateral recess bridge 662 may have an arc length in a range of 0.10 in. (2.5 mm) to 6.0 in. (152.4 mm).

In some embodiments, a plurality of lateral recess bridges 662 have the same arc length. In other embodiments, a plurality of lateral recess bridges 662 have different arc lengths. For example, two lateral recess bridges 662 may have arc lengths of 0.20 in. (5.1 mm), and 0.50 in. (12.7 mm). In other examples, three lateral recess bridges 662 may have arc lengths of 0.30 in. (7.6 mm), 0.70 in. (17.8 mm), and 3.0 in. (76.2 mm). In still other embodiments, five lateral recess bridges 662 may have arc lengths of 0.40 in. (10.2 mm), 0.50 in. (12.7 mm), 0.50 in. (12.7 mm), 0.80 in. (20.3 mm), and 1.0 in. (25.4 mm).

In some embodiments, the body 634, the connection member 650, the accessory connection 660, and the accessory 658 are each fabricated from a different material. In other embodiments, two or more of the body 634, the connection member 650, the accessory connection 660, and the accessory 658 are fabricated from the same material. For example, the body 634 may be fabricated from an erosion resistant material, such as a metal matrix composite, tungsten carbide, cemented tungsten carbide, or other ceramic materials. The connection member 650 may be fabricated from a hard steel alloy, such as tool steel. The accessory connection 660 may be fabricated from a softer steel alloy, such a quench tempered steel, and the accessory 658 may be fabricated from an ultra-hard material such as polycrystalline diamond. In this manner, a hard but brittle body may be connected to a ductile accessory connection using steel connection members.

In some embodiments, the body 634, the connection member 650, the accessory connection 660, and the accessory 658 each have materials with different thermal capacities. For example, the body 634 may be manufactured from a metal matrix composite with a high thermal capacity. The connection member 650 may be manufactured from a steel alloy with a medium thermal capacity, and the accessory connection 660 may be manufactured from a steel alloy with a low thermal capacity. Manufacturing the body 634 separately from the connection member 650 may then reduce the degradation of the connection member that may occur during the additive manufacturing process.

As described herein, in some embodiments, the accessory may be a junk-slot nozzle. In other embodiments, the accessory may be any accessory used in the BHA and/or the bit. For example, the accessory may include a cutting element. In other examples, the accessory may include a hydraulic nozzle used in BHA hydraulics. In still other examples, the accessory may include directional drilling pads. In yet other examples, the accessory may include a valve. In yet other examples, the accessory may be a blade. In still other examples, the accessory may be a blade segment. In further examples, the accessory may be a cutting element. In yet further examples, the accessory may be or include measuring or sensing equipment. In at least one example, the accessory may be a connection pin or box that allows the bit to connect to a drill string. In some embodiments, the body includes the drill bit, and the accessory may be the pin connector that screws into the drill bit for connecting the drill bit to the rest of the BHA and drill string.

In some embodiments, a body may have more than one bore. In some embodiments, each bore may be sized to accept the same accessory. For example, a bit may have a plurality of cutting elements, each of which may connect to the bit using embodiments of the present disclosure. In other examples, a bit may have a plurality of junk slots, and the bit may have one or more nozzles for each junk slot (or for some but not all junk slots), with each nozzle installed in a bore using embodiments of the present disclosure. In other embodiments, a body may have more than one size of bore. For example, a body may have a plurality of cutting elements connected using embodiments of the present disclosure, as well as at least one junk slot with a nozzle in the junk slot connected using embodiments of the present disclosure.

In some embodiments, the bore is continuous through the body. For example, the bore may be a hydraulic conduit used to transport hydraulic fluid, water, drilling mud, and so forth. In other embodiments, the bore may only extend part of the way through the body, so that the bore is closed at one end. For example, the bore may be configured to hold cutting element inserts.

Figures 1, 7:
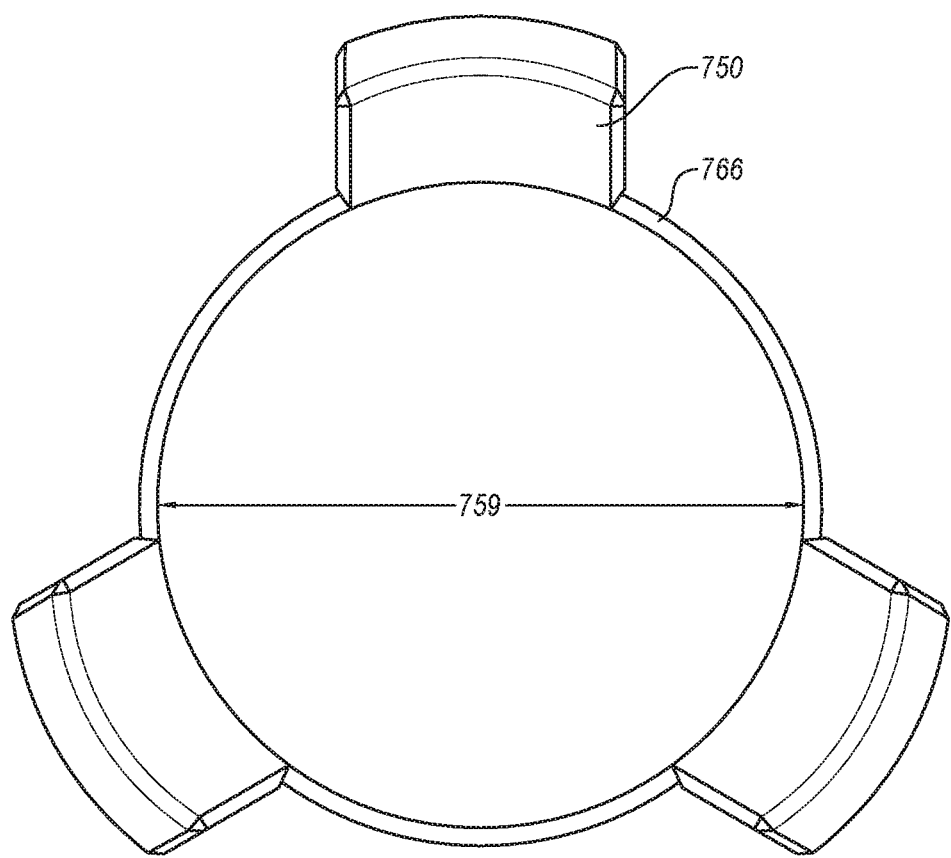
Figures 2, 7:
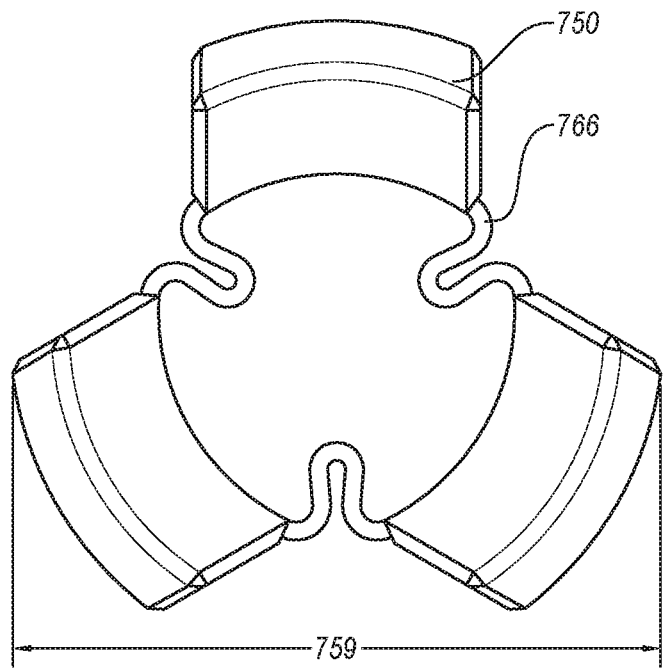

Referring now to FIG. 7-1, in some embodiments, a plurality of connection members 750 may be connected together with a flexible connector 766. In some embodiments, the flexible connector 766 may be fabricated from a resiliently flexible material. In some embodiments, the flexible connector 766 may connect to the plurality of connection members 750 at a radially inward point. In this manner, the plurality connection members 750 and the flexible connector 766 may circumscribe a generally circular shape. For example, the plurality of connection members 750 and the flexible connector 766 may circumscribe a circle that has approximately the same cross-sectional shape and size as the bore.

In some embodiments, the plurality of connection members 750 and the flexible connector 766 may have a first expanded configuration. In some embodiments, the first expanded configuration may have a similar cross-sectional diameter as the bore diameter 739. Referring now to FIG. 7-2, in some embodiments, each connection member 750 may have a radially inward force applied, deforming the flexible connector 766. In some embodiments, the connection members 750 may move radially inward to a second, compressed configuration. In the second compressed configuration, a circle circumscribed around the radially outward edges of the connection members 750 may have a diameter less than the bore diameter 739. The plurality of connection members 750 may then be inserted into the bore.

In some embodiments, the flexible connector 766 is a resiliently flexible connector. For example, the flexible connector 766 may be fabricated from spring steel. In other examples, the flexible connector 766 may be fabricated from plastic. In still other examples, the flexible connector 766 may be fabricated from rubber. In some embodiments, the bore includes a plurality of lateral recesses with similar shape and radial spacing as the plurality of connection members 750 attached to the flexible connector 766. When the plurality of connection members 750 in the compressed configuration is inserted into the bore and reaches the plurality of lateral recesses, the resiliently flexible connector 766 may expand the plurality of connection members 750 from the second compressed configuration to the first expanded configuration. This expansion may insert the plurality of connection members 750 into the plurality of lateral recesses. In some embodiments, the resiliently flexible connector 766 may help retain the connection members 750 in place in the plurality of lateral recesses.

In some embodiments, the flexible connector 766 is not resilient. In some embodiments, when the plurality of connection members 750 moves from the first expanded configuration to the second compressed configuration, the plurality of connection members 750 will retain that shape until radially outward forces are applied to the plurality of connection members 750.

In some embodiments, the flexible connector 766 is fabricated simultaneously with the plurality of connection members 750, making it an integral part of each connection member 750. For example, the flexible connector 766 may be additively manufactured simultaneously with the plurality of connection members 750. In other embodiments, the flexible connector 766 is fabricated separately from and later attached to the plurality of connection members 750. For example, the flexible connector 766 may be glued to the plurality of connection members 750 using an adhesive. In other examples, the flexible connector 766 may attach to the plurality of connection members 750 using a mechanical clip or connection. In still other examples, the flexible connector 766 may be welded to the plurality of connection members 750.

In some embodiments, the flexible connector 766 may be a single continuous unit. In other embodiments, the flexible connector 766 may be separated into two or more pieces. For example, the flexible connector 766 may extend only between individual connection members 750. In other examples, the flexible connector 766 may extend through more than one connection member 750.

Figure 8:
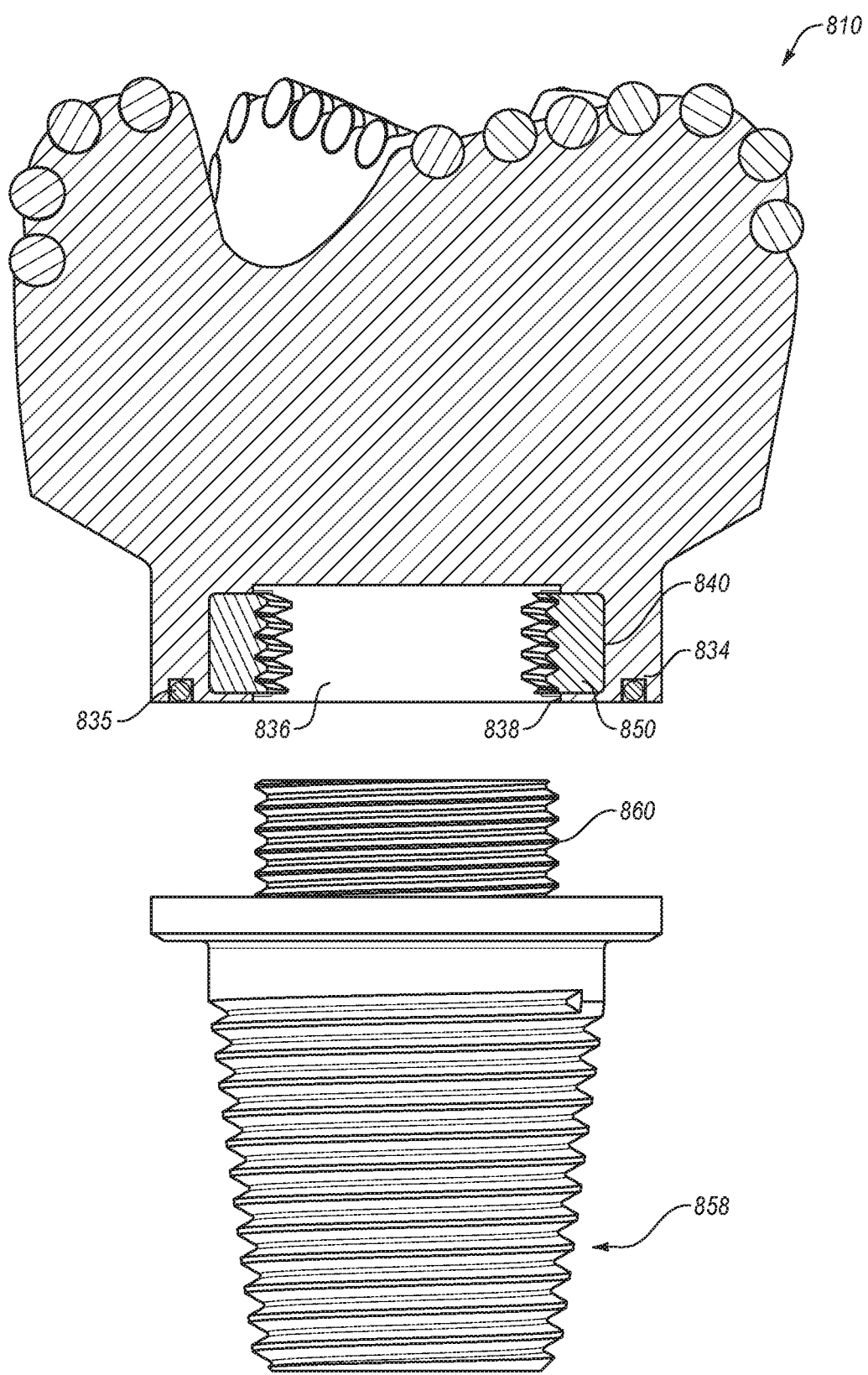
FIG. 8 is an exploded cross-sectional view of a bit having at least one connection member in a lateral recess, according to at least one embodiment of the present disclosure.

FIG. 8 is an exploded, partial side cross-sectional view of an embodiment of a bit 810 assembled using a connection according to the present disclosure. Although most accessories described herein refer to nozzles and smaller accessories, some accessories may be larger components of the bit and/or drill string. For example, a body 834 may be the bit body of the bit 810 and a bore 836 may be an axial bore in the bit body. The bore 836 may have an inner surface 838 with at least one recess 840 positioned therein. The recess 840 may be sized and configured to receive a connection member 850 with a threaded connection 856 or other connection interface.

The accessory 858 may be a pin connector that allows the bit 810 to connect to a component of a BHA or other component of a drill string. The accessory 858 may have an accessory connector 860, such as pin or male threads, that mates with the connection member 850 positioned in the body 834. By incorporating a connection system according to the present disclosure, a pin connector including a relatively tough material, such as a steel alloy, may be connected to a bit body including a relatively erosion and/or wear resistant material, such as tungsten carbide, that may be too brittle to use a threaded connection. In other examples, the pin connector and bit body may be coupled even if they are the same material or have similar material properties. Additional features such as seals 835 may be added to the body of the bit 810 and/or to pin connector 858 to create a fluid seal when the bit 810 and pin connector 858 are coupled together.

Figure 9:
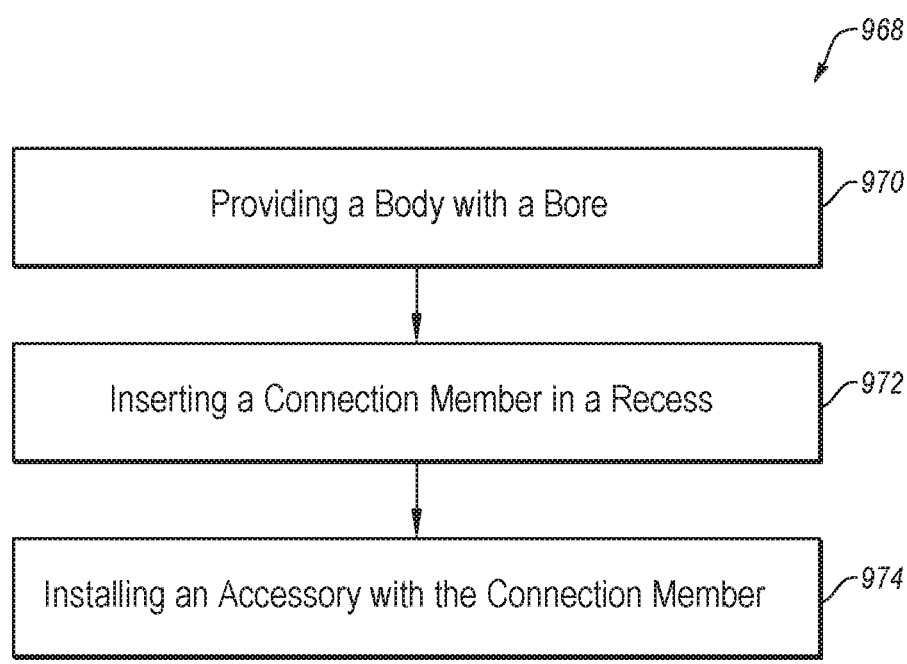
FIG. 9 is a method chart illustrating a method of fixing an accessory to a body, according to at least one embodiment of the present disclosure.

FIG. 9 illustrates a method 968 for fixing an attachment to a body. In some embodiments, the method 968 includes providing 970 a body. Providing 970 a body may include providing 970 a body that includes at least one bore. The bore may include a plurality of lateral recesses. In some embodiments, providing 970 the body may include additively manufacturing the body. In other embodiments, providing 970 the body may include purchasing a pre-fabricated body. In still other embodiments, providing 970 the body may include casting the body.

In some embodiments, at least one connection member may be inserted 972 into the plurality of lateral recesses. In some embodiments, the at least one connection member may include a threaded connection. In some embodiments, the method 968 then includes installing 974 an accessory in bore. In some embodiments, the accessory may be installed 974 by rotating the accessory, attached to an accessory connection, within the connection member. In some embodiments, the accessory and accessory connection may be rotated with a torque.

In some embodiments, the method 968 may further including pinching 976 the accessory at the accessory connection with the at least one connection member. Pinching 976 the accessory connection may occur as a result of a radially inward taper on in the lateral recess. When the accessory is rotated in the accessory connection, the connection members may be drawn up in the lateral recess, and the taper in the lateral recess may cause the connection members to move laterally inward, thereby pinching the accessory at the accessory connection.

The embodiments of the split thread attachment have been primarily described with reference to wellbore drilling operations; the split thread attachment described herein may be used in applications other than the drilling of a wellbore. In other embodiments, the split thread attachment according to the present disclosure may be used outside a wellbore or other downhole environment used for the exploration or production of natural resources. For instance, the split thread attachment of the present disclosure may be used in a borehole used for placement of utility lines. Accordingly, the terms "wellbore," "borehole" and the like should not be interpreted to limit tools, systems, assemblies, or methods of the present disclosure to any particular industry, field, or environment.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A downhole tool comprising:
a body including a first material, the body including at least one bore, wherein the at least one bore includes a plurality of lateral recesses;
at least one connection member positioned within the plurality of lateral recesses, wherein the at least one connection member comprises a threaded connection; and
an accessory including a second material fastened to the at least one connection member.

2. The downhole tool of claim 1, each lateral recess of the plurality of lateral recesses including a recess surface, and the recess surface being tapered radially inward relative to an axis of the at least one bore.

3. The downhole tool of claim 2, the at least one connection member including an outer surface, and the outer surface being complementarily shaped to the recess surface.

4. The downhole tool of claim 1, the at least one connection member being coupled to the body in a lateral recess of the plurality of lateral recesses.

5. The downhole tool of claim 1, at least one recess of the plurality of recesses having a sidewall, the at least one connection member being positioned in contact with the sidewall.

6. The downhole tool of claim 1, the first material being a metal matrix composite.

7. The downhole tool of claim 1, the at least one connection member being manufactured from tool steel.

8. The downhole tool of claim 1, further comprising a plurality of connection members, and wherein each connection member of the plurality of connection members is connected by a flexible connector.

9. The downhole tool of claim 1, further comprising a sealing ring located at the top and/or the bottom of the lateral recess.

10. The downhole tool of claim 1, the at least one bore being continuous from an outer surface of the body to an inner conduit of the body.

11. A cutting tool comprising:
a body including a first material;
at least one cutting element fixed relative to the body;
at least one bore in the body, the at least one bore having an inner surface and a longitudinal axis, the at least one bore being continuous from an outer surface of the body to an inner conduit of the body;
a plurality of lateral recesses in the inner surface of the at least one bore in a radial direction away from the longitudinal axis, the plurality of lateral recesses disposed a longitudinal depth from the outer surface of the body; and
a plurality of lateral recess bridges, wherein each lateral recess bridge extends in a circumferential direction about the longitudinal axis, each lateral recess bridge is disposed at the longitudinal depth from the outer surface of the body, and each lateral recess bridge comprises a portion of the body between adjacent lateral recesses.

12. The cutting tool of claim 11, each lateral recess of the plurality of lateral recesses having a rectangular lateral cross-section.

13. The cutting tool of claim 11, each lateral recess of the plurality of lateral recesses having a recess surface, and the recess surface includes a radially inward taper.

14. The cutting tool of claim 11, the plurality of lateral recess bridges have the same arc length.

15. A method for manufacturing a downhole tool, the method comprising:
providing a body, wherein the body includes at least one bore having an inner surface, wherein the inner surface includes a plurality of lateral recesses;
inserting at least one connection member into the plurality of lateral recesses; and
installing an accessory in the at least one bore by rotating an accessory connection adjacent the at least one connection member with a torque.

16. The method of claim 15, wherein the torque is greater than 25 lbf (33.9 N m).

17. The method of claim 15, wherein providing the body includes additively manufacturing the body from a metal matrix composite.

18. The method of claim 15, wherein providing the body includes machining the at least one bore into the body.

19. The method of claim 15, further comprising pinching the accessory at the accessory connection with the at least one connection member, wherein the at least one connection member and the accessory connection include matching threaded connections, and at least one lateral recess of the plurality of lateral recesses include a radially inward taper.

20. The method of claim 15, wherein the at least one bore includes a nozzle bore and the accessory is a nozzle.

* * * * *